Patented Feb. 6, 1951

2,540,475

UNITED STATES PATENT OFFICE 2,540,475

COMPOSITIONS COMPRISING ACRYLONITRILE POLYMERS

Masten Rufus Dalton, New Castle, Del., assignor to American Viscose Corporation, Wilmington, Del., a corporation of Delaware No Drawing. Application August 25, 1947, Serial No. 770,555

4 Claims. (Cl. 260—32.4)

This invention relates to new compositions of matter comprising polymers of acrylonitrile, including copolymers and interpolymers, dissolved in α-chloro β-hydroxy propionitrile.

Various organic substances have been proposed for effecting the dissolution of acrylonitrile polymers. It is recognized that effective dissolution of the polymers, and particularly those containing a high percentage by weight of acrylonitrile in the polymer molecule, depends upon the use of substances capable of undergoing hydrogen bonding with the active hydrogen bonding groups of the polymer molecule, thus weakening the strong hydrogen bond within the polymer molecule, and causing the hydrogen bonding forces to be shared between molecules of the polymers and the solvent, whereby a molecular dispersion of the polymers within the solvent, and thus a solution, is formed. It is also recognized that substances useful for effecting dissolution of the polymer must contain so-called "solvogenic" groups and must have a carbon to solvogenic group ratio within certain well-defined limits. The solvogenic groups which have been mentioned previously are dimethyl carbamyl, formyl imido, cyanomethylene, thio-cyanomethylene, and sulphoxymethylene groups. It is recognized that when more than one of the above-mentioned solvogenic groups are present, their effect is additive.

I have found that even when all of the conditions indicated above are met, organic substances still exhibit a high degree of specificity insofar as solvation of the acrylonitrile polymers is concerned, and particularly a high degree of specificity as to the conditions under which the dissolution is effected. In general, the substances which have been proposed heretofore for use as solvents for the acrylonitrile polymers effect the dissolution only at high temperatures well in excess of 100° C., and in the neighborhood of 150° C., the elevated temperature at which the complete dissolution is effected being critical to the production of clear solutions. Moreover, the solutions obtained at the high temperatures tend to gel when the temperature has dropped only a relatively few degrees, and, in some cases, separation of the gel into two distinct phases is noticeable after standing for only a comparatively short period at the lower temperature. While the gel formation or syneresis is reversible, if a gel is once permitted to form, it must be heated to the high temperatures employed initially in order to again form a solution suitable for spinning filaments or casting films. This complicates use of the solutions on a commercial scale since means must be provided for maintaining the solutions in the fluid form until immediately prior to their use, or for reheating the gels just prior to use thereof to a temperature of 150° C. These difficulties are encountered, for example, when it is attempted to effect dissolution of the acrylonitrile polymers in β-hydroxy propionitrile although β-hydroxy propionitrile meets all of the previously recognized requirements for a solvent for the polymers. In order to effect dissolution of the acrylonitrile polymers in β-hydroxy propionitrile, a dispersion of the polymer in the solvent must be heated for two and one-half hours at a temperature of about 150° C. Dissolution of the polymer in β-hydroxy propionitrile is not even initiated until the dispersion reaches a temperature of 140° C. In order to maintain the polymer in solution in the β-hydroxy propionitrile, it is necessary to apply external heat to the material continuously, since gel formation sets in immediately if the temperature of the solution falls even a few degrees below 150° C., and is pronounced if the temperature drops to 115° C. Obviously, this presents a problem of considerable proportion if it is desired to utilize the solution on a large scale commercial basis.

I have now found that although β-hydroxy propionitrile cannot be regarded as a practicably useful solvent for the acrylonitrile polymers, α-chloro-β-hydroxy propionitrile is eminently satisfactory, and may be used to produce clear stable solutions of the polymers which remain in the fluid or flowable condition indefinitely under commercially feasible working and storing conditions. Thus, I have found that α-chloro-β-hydroxy propionitrile has a marked dissolving effect on the polymers at temperatures as low as 70° C., and that the polymers can be brought to complete dissolution in the solvent at a temperature of approximately 100° C., and in the case of polyacrylonitrile, at a temperature of about 105° C. Moreover, I have found that α-chloro-β-hydroxy propionitrile retains the polymers in the completely dissolved condition, for practically indefinite periods, at temperatures well below 100° C., no tendency to gel formation being observable at temperatures of 50° C. or higher. Even at temperatures below 50° C., gelation takes place very slowly, and the solutions may be allowed to stand at the low temperatures for a prolonged period of time before complete gelation occurs, or the composition shows any tendency to separate into phases.

This has the decided advantage that the solutions may be prepared and then stored under practical storage conditions prior to their use, without requiring re-heating.

The solutions of the present invention are obtained by dispersing the selected acrylonitrile polymer in particulate form in α-chloro-β-hydroxy propionitrile at room temperature, and heating the dispersion, with constant agitation, to a temperature of about 100° C. until a clear solution is formed, usually about two hours. The clear solution obtained initially may be allowed to stand for indefinite periods at temperatures of about 50° C. or higher without danger of gel formation or loss of clarity.

The acrylonitrile polymer solutions in α-chloro-β-hydroxy propionitrile may be used as lacquers or coating compositions, for the production of films, sheets, rods, tubes, containers for various substances, etc., or for the production of other shaped articles, such as fibers.

The acrylonitrile polymers which may be dissolved in α-chloro-β-hydroxy propionitrile, in accordance with this invention, include the homopolymer, polyacrylonitrile, as well as copolymers and interpolymers of acrylonitrile with other polymerizable substances, for example, compounds containing one or more ethylenic linkages such as vinyl acetate, vinyl chloride, acrylic acid and its esters and homologs, styrene, isobutylene, and butadiene, as well as other vinyl and acrylic compounds, other olefinic or diolefinic hydrocarbons, etc., and polymers of such substances. The copolymers may contain varying amounts of acrylonitrile by weight in the polymer molecule, the acrylonitrile being present, usually, in amounts of from 50 to 95%. The following example in which the parts, proportions, and percentages are by weight unless otherwise specified, will serve to illustrate the invention.

*Example*

12.5 parts of a polymer of acrylonitrile having molecular weight of 200,000, in the form of particles of 60 mesh, were dispersed in 88 parts of α-chloro-β-hydroxy propionitrile at room temperature. The temperature of the dispersion was raised with continued stirring. The polymer began to dissolve at 70° C., and dissolution was complete at about 105° C. A clear, colorless solution containing the polymer in a concentration of 12.5% was obtained. The solution was substantially colorless and homogeneous, and stable at temperatures of 50° C. and higher.

Since some changes and modifications in specific details may be made in carrying out the invention without departing from the nature and spirit thereof, it is to be understood that the invention is not to be limited except as set forth in the appended claims.

I claim:

1. A composition of matter comprising an acrylonitrile polymer dissolved in α-chloro-β-hydroxy propionitrile.

2. A composition as claimed in claim 1, wherein the acrylonitrile polymer is polyacrylonitrile having a molecular weight of approximately 200,000.

3. Method of preparing clear, homogeneous and stable solutions of acrylonitrile polymers which comprises dispersing the acrylonitrile polymer, in particulate form, in α-chloro-β-hydroxy propionitrile, at room temperature, heating the dispersion, with agitation thereof, to a temperature of from 100° C. to 105° C. and agitating the mass at the last-mentioned temperature until dissolution of the polymer is complete.

4. Method of preparing clear, homogeneous and stable solutions of polyacrylonitrile which comprises dispersing the polyacrylonitrile, in particulate form, in α-chloro-β-hydroxy propionitrile, at room temperature, heating the dispersion, with agitation thereof, to a temperature of 105° C., and agitating the mass at the last-mentioned temperature until dissolution of the polyacrylonitrile is complete.

MASTEN RUFUS DALTON.

REFERENCES CITED

The following references are of record in the file of this patent:

UNITED STATES PATENTS

| Number | Name | Date |
|---|---|---|
| 2,404,726 | Charch | July 23, 1946 |